J. G. MacPHERSON, DEC'D.
M. L. MacPHERSON & C. L. HARSHA, EXECUTORS.
COMBINED CLUTCH AND GEAR SHIFTING MECHANISM FOR MOTOR VEHICLES.
APPLICATION FILED MAR. 26, 1917.
1,252,131.
Patented Jan. 1, 1918.
6 SHEETS—SHEET 1.
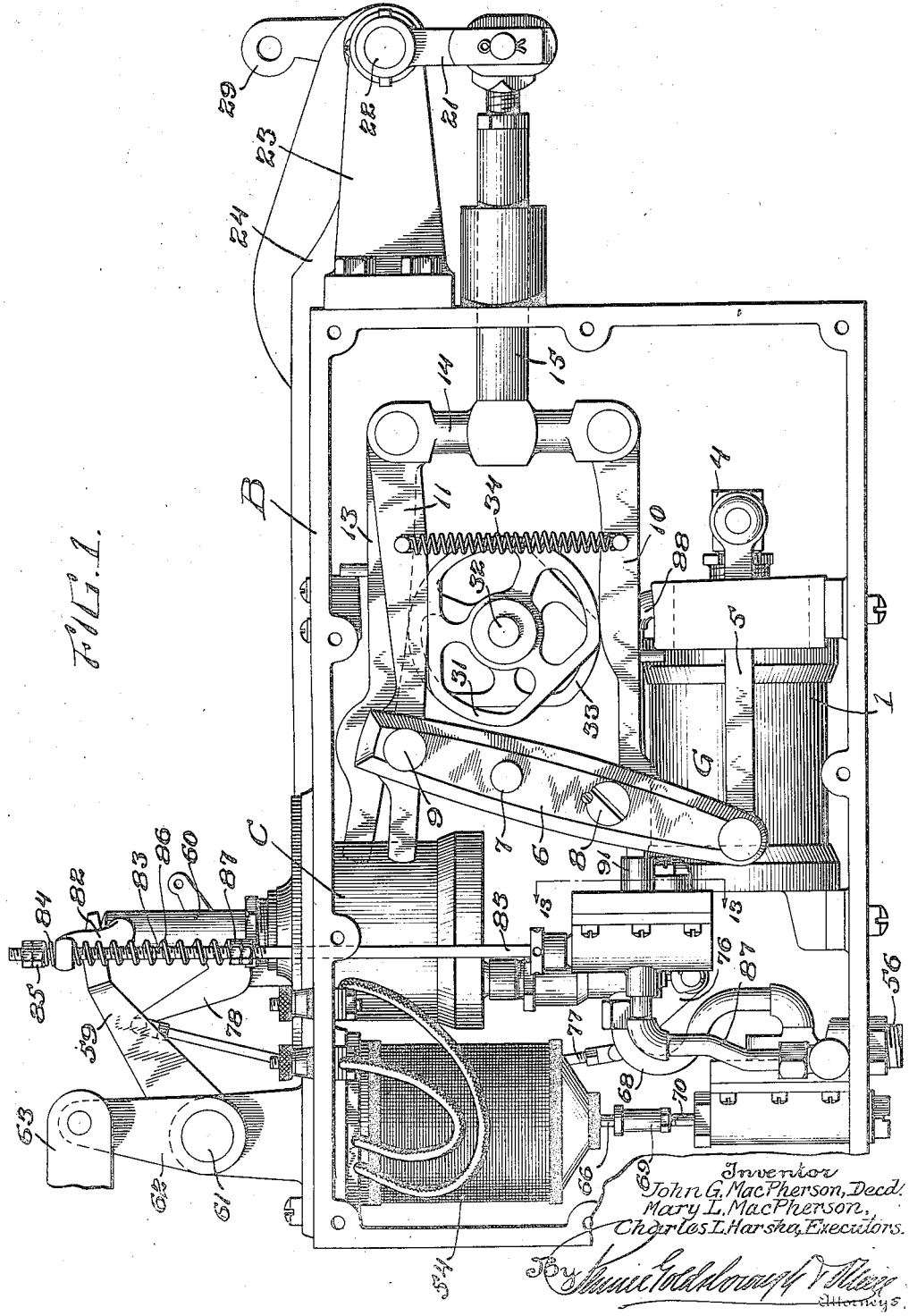
Inventor
John G. MacPherson, Decd.
Mary L. MacPherson,
Charles L. Harsha, Executors.

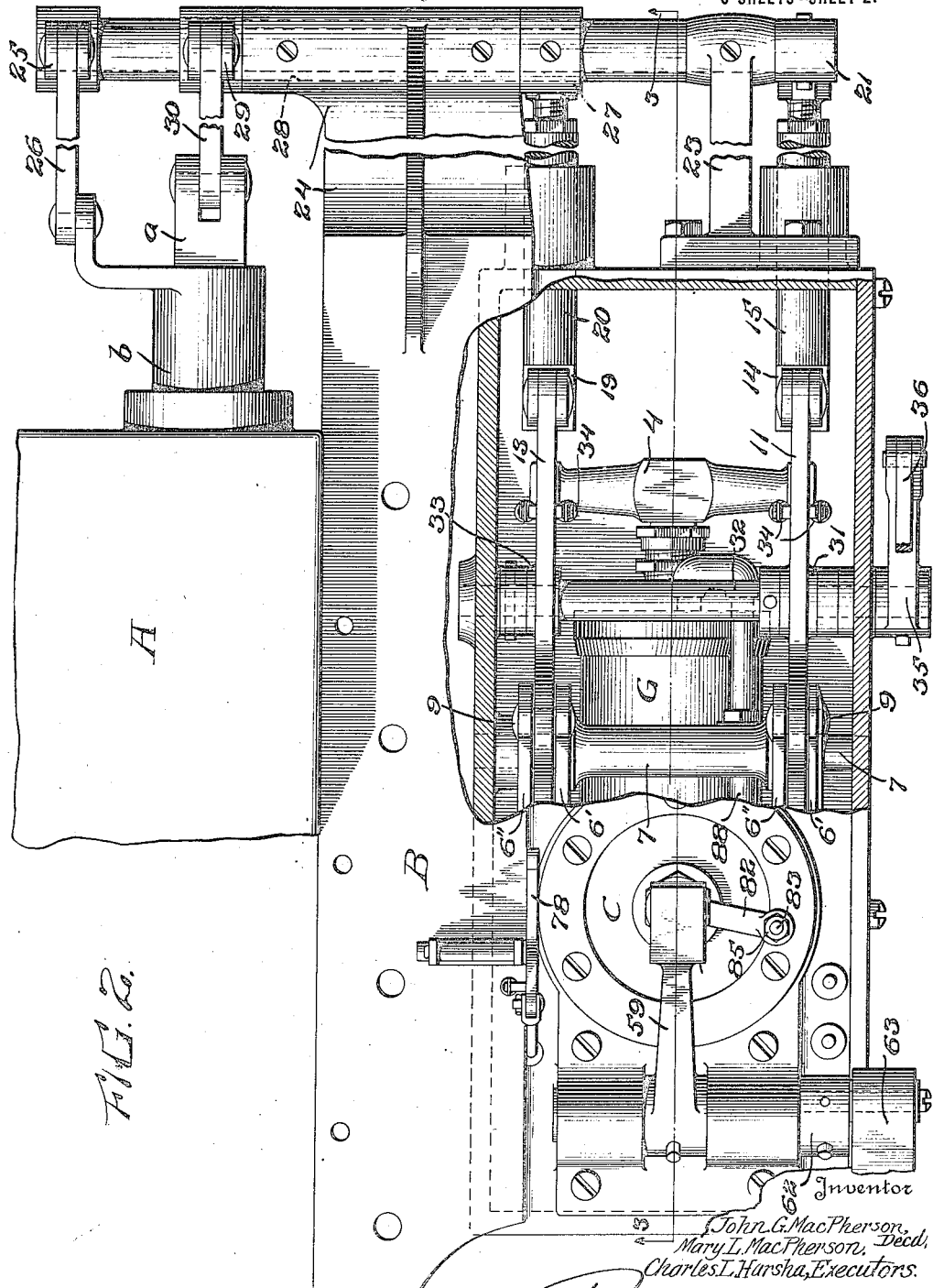

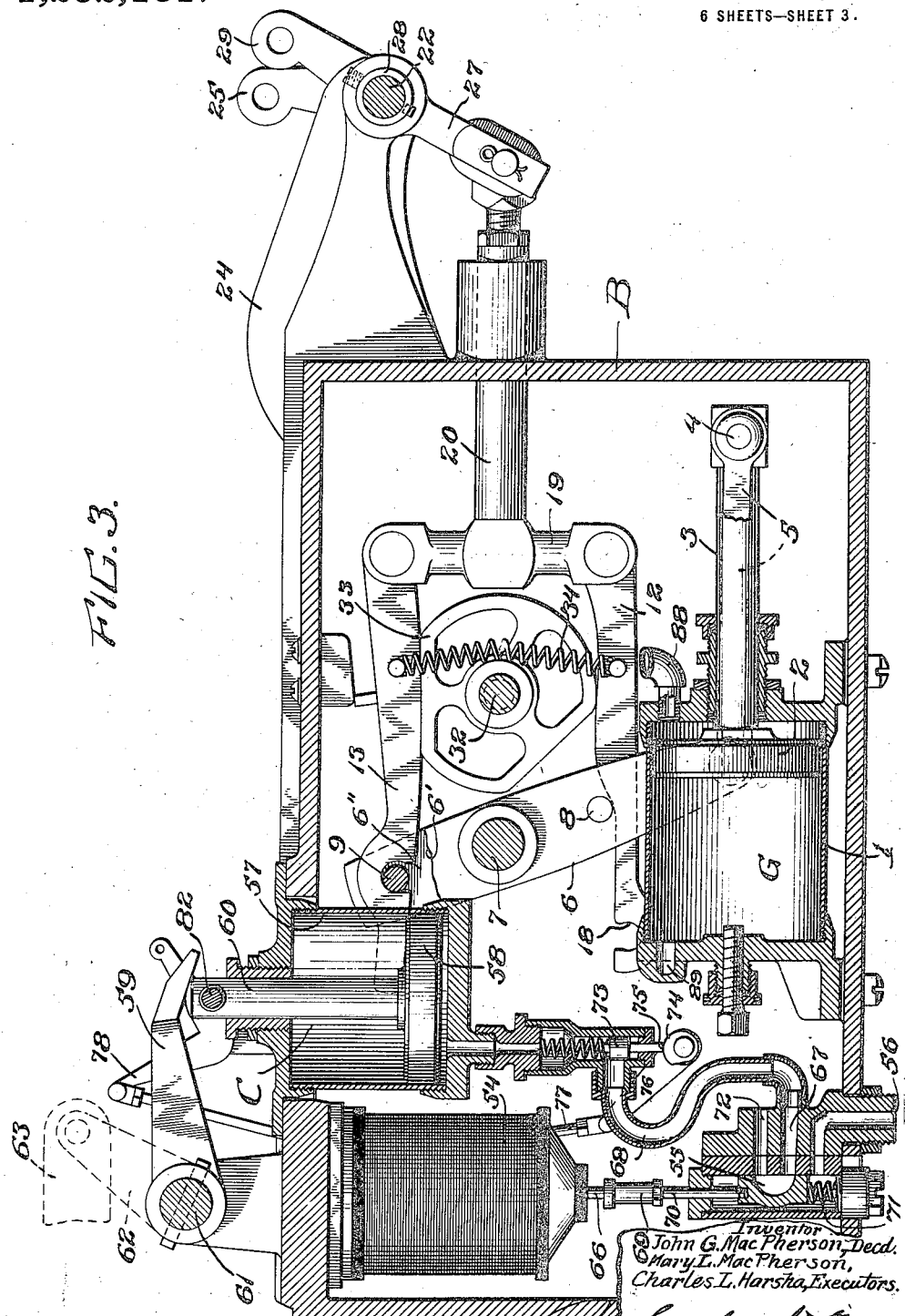

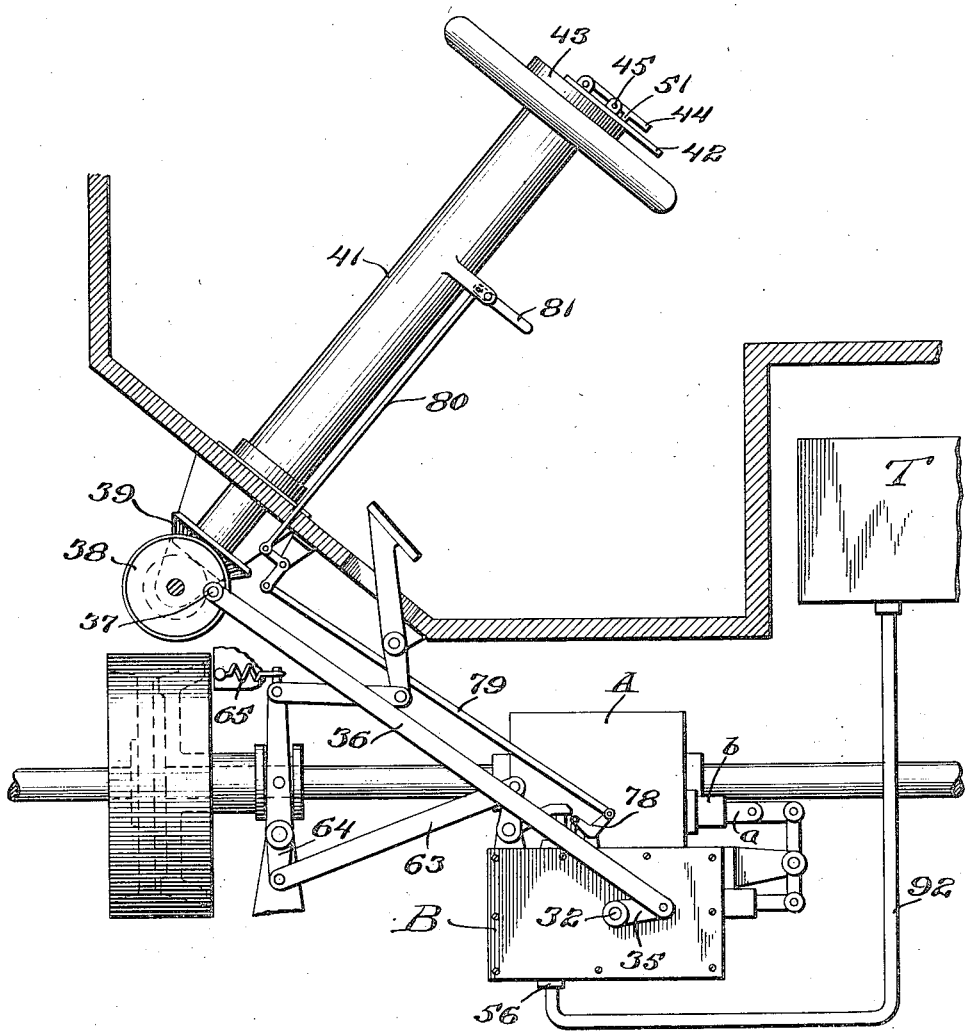

J. G. MacPHERSON, DEC'D.
M. L. MacPHERSON & C. L. HARSHA, EXECUTORS.
COMBINED CLUTCH AND GEAR SHIFTING MECHANISM FOR MOTOR VEHICLES.
APPLICATION FILED MAR. 26, 1917.
1,252,131.
Patented Jan. 1, 1918.
6 SHEETS—SHEET 5.
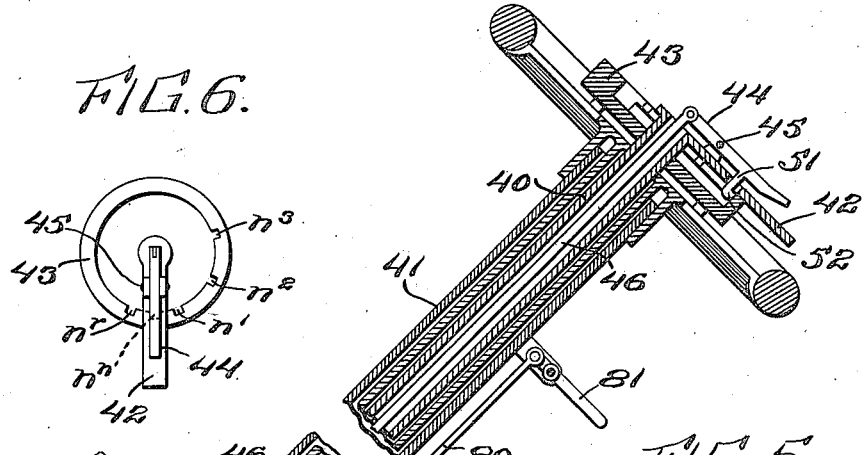
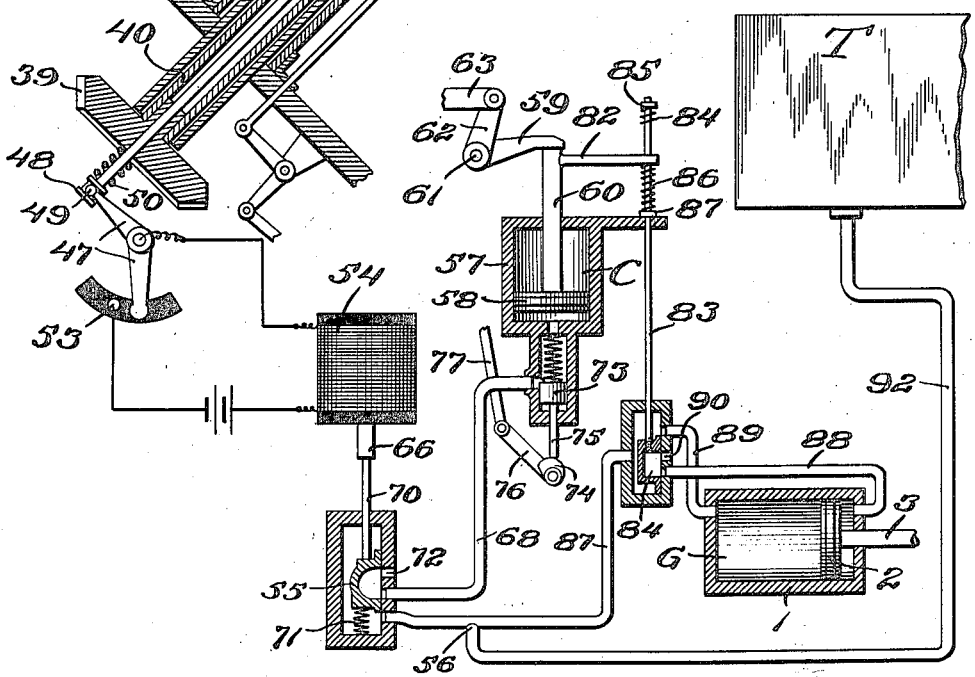
Inventor
John G. MacPherson, Decd.
Mary L. MacPherson,
Charles L. Harsha, Executors.

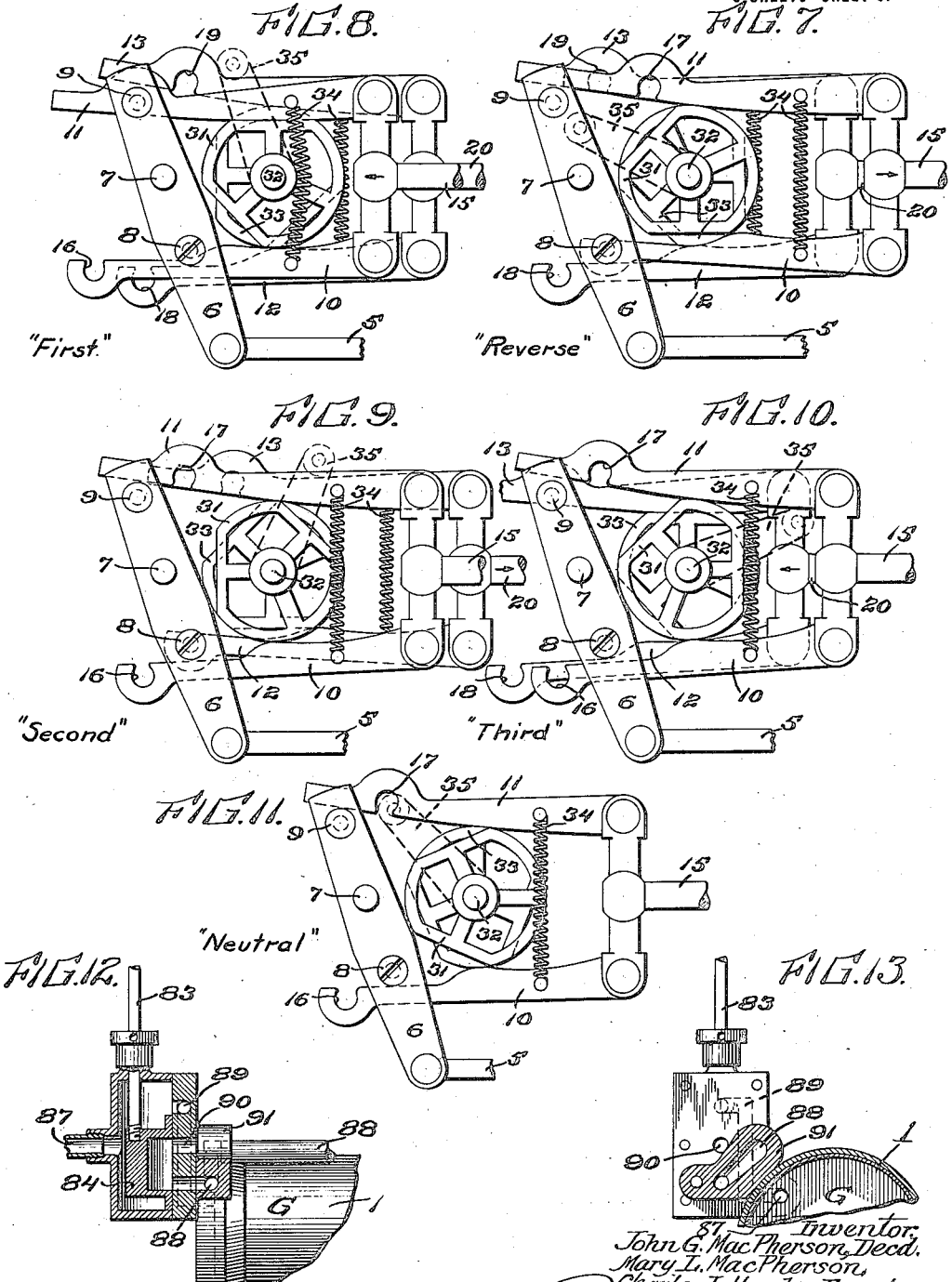

UNITED STATES PATENT OFFICE.

JOHN G. MacPHERSON, DECEASED, LATE OF PHILADELPHIA, PENNSYLVANIA, BY MARY L. MacPHERSON AND CHARLES L. HARSHA, EXECUTORS, BOTH OF CANONSBURG, PENNSYLVANIA, ASSIGNORS TO ELECTRO-PNEUMATIC GEAR SHIFT CORPORATION, OF WILMINGTON, DELAWARE.

COMBINED CLUTCH AND GEAR SHIFTING MECHANISM FOR MOTOR-VEHICLES.

1,252,131.

Specification of Letters Patent.

Patented Jan. 1, 1918.

Application filed March 26, 1917. Serial No. 157,511.

*To all whom it may concern:*

Be it known that JOHN G. MACPHERSON, deceased, late a citizen of the United States, and resident of the city and county of Philadelphia and State of Pennsylvania, did invent certain new and useful Improvements in Combined Clutch and Gear Shifting Mechanism for Motor-Vehicles, of which the following is a specification.

This invention relates to change speed mechanism of the same general type as that disclosed in prior Patent, No. 1,160,922, of November 16, 1915, but embodying the improvements hereinafter set forth.

In said prior patent above referred to, in which the change speed mechanism is disclosed in combination with a motor vehicle, pneumatic means is provided for shifting the gears of the variable speed transmission mechanism, and a plurality of selective levers are interposed between the pneumatic means and the gear shifting members to effect proper movements of the gear shifting members by the pneumatic means. The selective levers are controlled by means of cam mechanism actuated from the steering wheel of the motor vehicle and air is admitted to the pneumatic means by valve mechanism also actuated from the steering wheel. In said prior patent, the means above referred to for actuating the valve mechanism and the cam mechanism from the steering wheel, also has associated therewith means for controlling certain electric circuits to effect shifting of the clutch through the intermediary of pneumatic means comprising a valve, the latter being actuated as a result of the completion of said electric circuits.

In the present instance, the general arrangement of the pneumatic means for effecting movement of the gear shifting members, the selective levers and the cam mechanism for controlling the latter is substantially the same as that disclosed and claimed in my prior patent, but the operation of the pneumatic means employed for shifting the clutch is utilized to actuate the valve that supplies air to the gear shifting pneumatic means. This greatly simplifies the construction because when the clutch is shifted as by manipulating a lever on the steering wheel, the supply of air to the pneumatic means for shifting the gears automatically takes place. In said prior patent it is necessary to produce a special valve for admitting and exhausting air from the gear shifting pneumatic means and to actuate this valve by direct connections interposed between the valve and the manual controlling means on the steering wheel, but this part of the construction is herein modified and simplified. The foregoing difference between the apparatus herein disclosed and that disclosed in said prior patent will be more apparent after the improved apparatus is described in detail and certain other differences will appear as the specification proceeds.

The invention is illustrated in the accompanying drawings, in which:—

Figure 1 is a side elevation of the casing containing the pneumatic clutch shifting mechanism and the pneumatic gear shifting mechanism, the front wall of the casing being removed to expose such mechanism;

Fig. 2 is a top plan view of the mechanism shown in Fig. 1 showing the relation of this mechanism to the gear box of the motor vehicle and the gear shifting members, a portion of the top of the casing being broken away to expose underlying mechanism;

Fig. 3 is a vertical section taken on the line 3—3 of Fig. 2;

Fig. 4 is a side elevation, partly in section, of the improved clutch and gear shifting mechanism associated with the motor vehicle and showing the various connections between such mechanism and the parts of the motor vehicle;

Fig. 5 is a more or less diagrammatic view showing the various valves and pneumatic cylinders employed and the connections between the same and also showing the steering post of the motor vehicle and the levers associated therewith for controlling the operation of the clutch and gear shifting mechanism;

Fig. 6 is a detail plan view of the manually actuated lever on the steering wheel for controlling the operation of the clutch and gear shifting mechanism;

Figs. 7 to 10, inclusive, are detail side elevations of the cam mechanism and the selective levers controlled thereby and show the various positions of the levers and the cam mechanism after the gears have been shifted for each speed;

Fig. 11 is a view somewhat similar to Figs. 7 to 10, but shows the cam mechanism in its "neutral" position, that is, in the position in which all of the selective levers are held in their inoperative positions;

Fig. 12 is a vertical section taken through the valve for controlling the air supplied to and exhausted from the pneumatic means for shifting the gears; and Fig. 13 is a vertical section taken on the line 13—13 of Fig. 1 showing the location of the passages leading from the valve of Fig. 12 to the pneumatic means for shifting the gears.

Referring particularly to Fig. 2, it will be seen that the gear box of the motor vehicle in which the above-mentioned variable speed transmission mechanism, or, in other words, the usual sliding gears, are located, is shown at A. The gears within the box A are shifted in the usual manner by a rod $a$ and a co-axially disposed cylindrical sleeve $b$. The members $a$ and $b$, herein referred to as the gear shifting members, are adapted to be shifted from their normal positions shown in Fig. 2 either to the right or to the left. When the sleeve $b$ is moved to the left from the position shown in Fig. 2, the gears are shifted within the box A in a predetermined manner. In the present instance, it will be assumed that when the sleeve $b$ is so shifted to the left, the gears in the box A will be shifted to their "reverse" position. In this position of the gears, the motor vehicle will be propelled backward. When the sleeve $b$ is shifted to the right from the position shown in Fig. 2, it will be assumed that the gears within the box A are shifted for "first" speed. Likewise when the rod $a$ is shifted to the left from the position shown in Fig. 2, it will be assumed that the gears within the box A are shifted for "second" speed, and when the rod $a$ is shifted to the right from the position shown in Fig. 2, that the gears are shifted for "third" speed. It will be understood that the rod $a$ and the sleeve $b$ are shown in Fig. 2 in their neutral positions in which the gears within the box A are out of mesh.

The pneumatic gear shifting mechanism is designed to produce the above movements of the gear shifting members $a$ and $b$. In the present instance, this mechanism is positioned within a casing B that is adapted to be rigidly secured directly to the gear box A or positioned in the vicinity thereof.

Referring to Figs. 1 to 3, inclusive, it will be seen that the above-mentioned casing B has positioned therein, a cylinder and piston denoted generally by the reference character G and which has been heretofore referred to as the pneumatic gear shifting means. The cylinder 1 of the pneumatic gear shifting means G contains a piston 2 carried by a piston rod 3 which passes out through the end wall of the cylinder 1 to a point where it is connected with a short cross shaft 4. This cross shaft is best shown in Fig. 2, from which it will be noted that it is horizontally disposed and extends transversely of the casing B. Each extremity of the cross shaft 4 has pivoted thereto, a link 5 which extends back toward the piston 2. One of these links is shown in Fig. 1 and the other one is shown in Fig. 3. From these figures, it will be noted that each link 5 is pivoted at its extremity to the lower end of a skeleton rock lever 6. It will be understood that there are two of the rock levers 6, one being located at one side of the cylinder 1 and the other being located at the other side of said cylinder. Both of the rock levers 6 are pivoted on a cross shaft 7 extending transversely of the casing B and supported therein in any suitable manner. Each of the rock levers 6 extends above the cross shaft 7, as clearly shown in Figs. 1 and 3.

Each of the rock levers 6 comprises two plates 6' and 6" (Fig. 3) spaced apart to provide an opening through which the selective levers hereinafter described may pass. Each rock lever 6 is provided at a point below the transverse shaft 7 with a pin 8 and at a point above said transverse shaft 7 with a pin 9. These pins pass through the skeleton levers 6 and are designed to be engaged by the notches formed in the selective levers now to be described.

The selective levers above mentioned are four in number and are shown at 10, 11, 12 and 13. The levers 10 and 11 constitute a pair and are both pivoted to a vertically disposed cross shaft 14 which is rigidly connected with a rod 15 that passes outwardly through the rear wall of the casing B. The forward ends of the levers 10 and 11 extend through one of the rock levers 6 and are provided with notches 16 and 17, respectively, (Fig. 10) for engagement with the pins 8 and 9 carried by the corresponding rock lever 6. The other two levers 12 and 13 comprising the second pair are so positioned that their extremities project through the other rock lever 6 and their extremities are provided with notches 18 and 19, respectively, (Fig. 8) for engagement with the pins 8 and 9 of the corresponding rock lever 6. The two selective levers 12 and 13 are pivoted to a second vertical cross shaft 19 (Fig. 3) similar to that shown at 14 and which is rigidly secured to a rod 20 passing rearwardly through the wall of the casing B. The two rods 15 and 20 thus passing rearwardly through the wall of the casing B are best shown in Fig. 2.

At a point outside of the casing B, the extremity of the rod 15 is pivoted to the extremity of a depending rock arm 21, which in turn, is keyed to a rock shaft 22. The rock shaft 22 is supported in brackets 23 and 24 carried by the casing B and passes transversely of said casing toward the gear shifting members *a* and *b*. As is shown in Fig. 2, the rock shaft 22 is connected with an upstanding rock arm 25 (see also Figs. 1 and 3), that is in turn connected by means of a link 26 directly to the gear shifting member *b*. The rod 20 is likewise pivoted at its extremity to a downwardly extending rock arm 27 which rocks about the axis of the shaft 22, but which is keyed to a sleeve 28 (Fig. 2) co-axially disposed on said shaft 22. The sleeve 28 also extends toward the gear shifting members *a* and *b* and carries an upstanding rock arm 29 similar to that shown at 25 and which is connected by means of a link 30 to the gear shifting member *a*.

From the foregoing, it is obvious that movement of the rod 15 to the right in Fig. 2 will rock the shaft 22 and move the gear shifting sleeve *b* to the left and that movement of said rod to the left in Fig. 2 will shift said sleeve *b* to the right. Likewise, shifting of the rod 20 to the right will rock the sleeve 28, and hence shift the gear shifting rod *a* to the left and movement of the rod 20 to the left will shift the rod *a* to the right. The direction of movement of the rods 15 and 20 to effect this shifting of the rod *a* and the sleeve *b* depends upon which of the four selective levers is in its operative position to engage with the corresponding pin of the rock levers 6. The positions of the selective levers is controlled by cam mechanism, best shown in Figs. 1 and 3, interposed between the selective levers. This cam mechanism comprises a cam 31 carried by a transversely extending shaft 32 and interposed between the two selective levers 10 and 11. This cam controls the positions of the levers 10 and 11. A second cam 33 also carried by the transversely extending shaft 32 is interposed between the other two selective levers 12 and 13 and controls their position. The cams 31 and 33 are so shaped and are so angularly disposed on the shaft 32 that either one of two conditions will exist. Either all of the selective levers will be held out of engagement with the corresponding pins of the rock levers 6, or else all but one of the selective levers will be held out of engagement with their corresponding pins. The first-mentioned condition is exemplified in Fig. 11, from which it will be noted that the cams are so positioned that all of the selective levers are held out of engagement with their corresponding pins on the rock levers 6. The various other positions of the cams 31 and 33 are shown in Figs. 8 to 10, inclusive, to be hereinafter more specifically described. It will be understood that the cams 31 and 33 are keyed to the shaft 32 hereinafter termed the "cam shaft" and will rotate as a unit when this cam shaft is actuated from the steering wheel, as will be later described.

The two selective levers 10 and 11 are interconnected by means of a coil spring 34 which tends to hold the selective levers against the interposed cam and tends to move said selective levers to their operative positions. Likewise, the other two selective levers 12 and 13 are interconnected by a second coil spring similar to that shown at 34, but which does not show in the drawings.

From the structure so far described, it is obvious that when air is admitted to the left-hand extremity of the cylinder 1, the piston 2 will be moved to the right, if said piston does not already occupy its right-hand position. Through the intermediary of the connections above described between the piston 2 and the rock levers 6, both of said rock levers will be simultaneously shifted to the position indicated in Fig. 3. If the cam mechanism comprising the cams 31 and 33 is in such position as to hold all of the selective levers out of engagement with the corresponding pins on the rock levers 6, the shifting of said rock levers will obviously have no effect upon the selective levers. If, however, the cams 31 and 33 are in such position as to permit one of the selective levers to engage with the corresponding pin on the rock levers, the shifting of the rock levers will also shift such selective lever either to the right or to the left, depending upon whether it is an upper or lower selective lever which happens to be in its operative position. For example, in Fig. 1, the selective lever 11 is in its operative position, and therefore, when the piston 2 moves to the right, the selective lever 11 will be shifted to the left, and hence the rod 15 to which said selective lever is connected, will shift the gear shifting sleeve *b* to the right. Fig. 3 shows the positions of the parts after the selective lever 12 has been shifted by the above-mentioned operations. If the lower lever 10 of the same pair of selective levers had been in its operative position, the same shifting of the rock lever 6 would have shifted said selective lever 10 to the right, and this would have resulted in a shifting of the gear shifting sleeve *b* to the left. Likewise, when the two selective levers 10 and 11 are in their inoperative positions and one of the selective levers 12 and 13 occupies its operative position, the rod 20 will be shifted either to the right or to the left when the piston 2 moves to the position shown in Fig. 3.

The cams 31 and 33 are shifted by means of a lever located on the steering wheel and the admission of air to produce movement of the piston 2 is also effected from the steering wheel. The connections between the cams and the above-mentioned lever on the steering wheel are best shown in Fig. 4, from which it will be noted that the cam shaft 32, at a point outside of the casing B, has secured thereto a rock arm 35 which is connected by means of a link 36 to a pin 37 carried by a gear 38 suitably supported below the flooring of the motor vehicle. The gear 38 meshes with a pinion 39 that is rigidly connected with a sleeve 40 (Fig. 5) that passes upwardly through the steering post 41 and at its upper end is connected to a hand lever 42. It is obvious that by shifting the hand lever 42, the gears 31 and 33 may be shifted to place the selective levers in their proper positions. The hand lever 42 operates over a quadrant 43 which is provided with a plurality of notches corresponding with the various positions of the cams. For instance, when the hand lever 42 lies over the notch $n^r$, the cams 31 and 33 will occupy the position shown in Fig. 7, in which the selective lever 10 will be in operative position to effect shifting of the gears to "reverse". When the hand lever 42 lies over a notch $n^1$, the cams will occupy the position shown in Fig. 8, in which the selective lever 11 will be in operative position to effect shifting of the gears for "first" speed. Likewise, when the hand lever 42 lies over the notches $n^2$ and $n^3$, the cams will be in the position shown in Figs. 9 and 10, respectively, in each of which the proper selective lever is in operative position to effect shifting of the gears for "second" and "third" speeds, respectively. Between the notches $n^r$ and $n^1$ is an additional notch $n^n$ over which the hand lever 42 should be positioned when the cams occupy the neutral position shown in Fig. 11.

Pivoted to the hand lever 42 is an auxiliary lever 44, the forward end of which is adapted to be depressed by the thumb in order to rock the auxiliary lever 44 about its pivotal connection 45 and thereby lift the rear end of the auxiliary lever. When so lifted, the auxiliary lever 44 will raise a rod 46 passing downwardly through the steering post and connected at its lower end with a bell crank lever 47. The lower end of the rod 46 carries a circularly recessed collar 48, in the recess of which a fork 49 carried by one arm of the bell crank lever 47 engages. This is to permit rotation of the rod 46 with respect to the bell crank lever when the hand lever 42 is actuated. A coil spring 50 acting upon the sleeve 48 serves to yieldingly hold the rod 46 in its lowermost position, and this holds the forward end of the auxiliary lever 44 in its raised position shown in Fig. 5. The auxiliary lever 44 carries a depending catch 51 having a tooth 52 which, in the normal position of the auxiliary lever 44 lies in one of the notches of the quadrant 43. When the tooth 52 is thus lying in one of the notches of the quadrant 43, the hand lever 42 is locked against rotation, and before said hand lever can be moved, it is necessary to depress the forward extremity of the auxiliary lever, which action will have the effect of moving the tooth 52 downwardly out of the notch. The hand lever 42 can then be turned and when so turned, the tooth 52 will engage under the solid portion of the quadrant and hold the auxiliary lever 44 depressed until the hand lever 32 reaches the next notch, at which time, providing the thumb is removed from the auxiliary lever, the latter will be moved back to its normal position by the spring 50.

One arm of the bell crank lever 47 constitutes an electric switch member, which, in the normal position of the auxiliary lever 44, occupies the position shown in Fig. 5. When the auxiliary lever 44 is depressed, this arm of the bell crank lever engages with an electric contact 53 to complete an electric circuit, represented diagrammatically in Fig. 5, for the purpose of energizing an electric solenoid 54. It is the function of the solenoid 54 to actuate a valve for the purpose of admitting air to the pneumatic means for shifting the clutch. This pneumatic means has not yet been described, and as it is the operation of such pneumatic means which results in the supply of air to and exhaust of air from the cylinder 1, this clutch shifting pneumatic means will now be described.

The solenoid 54 just described is also positioned within the casing B, as shown in Figs. 1 and 3. When energized, it serves to effect shifting of a valve 55 to admit compressed air from an air inlet 56 (Fig. 3) to the pneumatic clutch shifting means C through the passages hereinafter described. The clutch shifting means C comprises a cylinder 57 and a piston 58 mounted therein which is normally held in its lowermost position by means of an arm 59 which rests upon the extremity of the piston rod 60 to which the piston 58 is attached. The arm 59 is keyed to a rock shaft 61 which also carries an upstanding rock arm 62 connected by means of a link 63 with the clutch lever 64 (see Figs. 3 and 4). The main spring of the clutch or the auxiliary spring shown at 65 serves to retain the clutch in its engaged position, and hence holds the arm 59 in its lowermost position shown in Fig. 3. When air is admitted to the cylinder 57 and the piston 58 is lifted, the arm 59 is raised and the clutch lever 64 is shifted to throw out the clutch against the tension of the clutch spring (not shown in the drawing), or the auxiliary spring 65. The shifting of the clutch in this manner takes place when the auxiliary lever 44 is first depressed, as the bell crank lever 47 is then shifted to complete the electric circuit through the solenoid 54. The energization of the solenoid will cause the armature or core 66 to move downwardly and thereby effect downward movement of the valve 55. This will place the air passage 56 in communication with an air passage 67 formed in the valve seat so that air will be admitted through the pipe 68 to the cylinder 57. The piston 58 will then rise to throw out the clutch in the manner above described. The armature 66 of the solenoid makes loose contact with the upper portion 69 of the valve rod 70 and a coil spring 71 positioned under the valve 55 serves to return the same to its normal position when the electric circuit of the solenoid is broken. In other words, the spring 71 holds the valve 55 in the normal position shown in Fig. 3, in which the passage 67 is in communication with the atmosphere through a passage 72. When the solenoid is energized, the valve rod 70 is depressed and the valve 55 moves downwardly against the tension of the spring 71 and when the electric circuit of the solenoid is broken, the spring 71 returns the valve 55 to its normal position. When the circuit is thus broken, it is obvious that the air will be permitted to exhaust from the cylinder 57 through the passage 72 and the spring associated with the clutch will shift the same to its engaged position.

The speed at which the clutch engages may be regulated by controlling the speed at which the air is exhausted from the cylinder 57 to the atmosphere. This may be accomplished by means of a valve, such as the piston valve shown at 73. As will be seen from Fig. 3, this valve is interposed in the passage 68 and serves to throttle the air passing therethrough. The valve 73 is actuated by means of a small cam 74 that acts upon the stem 75 of the valve. A rock arm 76 serves to actuate this cam, which rock arm is in turn actuated by means of a link 77 connecting the rock arm with the bell crank lever 78 pivoted on the top of the casing B. As shown in Fig. 4, the bell crank lever 78 is actuated by means of the links 79 and 80 from a hand lever 81 positioned on the steering post. By actuating the hand lever 81, it is possible to change the position of the piston valve 73 to vary the extent to which said valve restricts the passage of the air through the pipe 68. The more the passage of the air is restricted, the slower the exhaust will be from the cylinder 57 and hence, the slower the clutch will engage.

It has been above stated that the operation of the pneumatic means for shifting the clutch controls the air supplied to and exhausted from the cylinder 1 of the pneumatic gear shifting means. This is accomplished as follows:

Secured to the upper end of the piston rod 60 is a laterally projecting arm 82 (see Fig. 1), the extremity of which is provided with an opening through which the valve stem 83 of a valve 84 passes. In Fig. 1, the valve 84 is inclosed by its casing, but this valve is disclosed in Fig. 5, which figure will be presently described in detail. The valve stem 83 passes loosely through the laterally projecting arm 82, but after a predetermined movement of the arm 82 in either direction, movement is imparted to the valve rod 83 through the intermediary of a coil spring 84 interposed between the top of the arm 82 and a shoulder 85 on the valve rod and through the intermediary of a second coil spring 85 interposed between the under surface of the arm 83 and a shoulder 87 on the valve rod. In the normal position of the parts when the clutch is in engagement and the piston rod 60 is in its lowermost position, as shown in Fig. 5, the spring 86 is compressed and the spring 84 which is relatively short, as shown in Fig. 5, assumes the position shown in this figure. It is obvious from Fig. 5 that when the piston rod 60 moves upwardly, the valve rod 83 will not be actuated until said piston rod nears the end of its upward stroke. This allows the clutch sufficient time to become completely disengaged before the valve 84 is actuated to shift the gears. On the down stroke of the piston rod 60, the valve rod 83 and hence the valve 84 will be actuated as soon as the piston rod 60 starts to move downwardly. This is for the purpose of allowing the gears to shift to their new position before the clutch again engages. The spring 86 permits the last portion of the downward stroke of the piston rod 60 to be performed without affecting the position of the valve 84.

The location of the valve 84 with respect to the rest of the parts in the casing B is shown in Fig. 1. It will be noted from this figure and also from Fig. 5, that the valve is supplied with compressed air directly from the inlet 56 and is capable in its raised position of admitting air to the right-hand end of the cylinder 1, and simultaneously placing the left-hand end of the cylinder in communication with the atmosphere. In the lowermost position of the valve 84, it supplies air to the left-hand end of the cylinder 1 and places the right-hand end in communication with the atmosphere. Compressed air is conducted from the inlet 56 to the valve 84 through a pipe 87. A passage 88 leading from the valve 84 to the right-hand end of the cylinder, a passage 89 leading from the valve to the left-hand end of the cylinder, and an exhaust passage 90 serve to admit air to each end of the cylinder 1 and discharge it therefrom in the manner above described. These passages are shown diagrammatically in Fig. 5, but are in reality formed in the casting 91 (Fig. 1) and lead to the cylinder 1 in the manner indicated in the sectional views of Figs. 12 and 13.

It will now be noted that when air is admitted to the cylinder 57 to throw out the clutch, the upward movement of the piston rod 60 effects upward movement of the valve 84 to admit air to the right-hand end of cylinder 1. This would have the effect of shifting the rock levers 6 to their normal position shown in Fig. 1, if they did not already occupy such position, and this action would serve to restore the gears to neutral position if they happened to be in mesh. When the clutch is allowed to reëngage by permitting the air to be exhausted from the cylinder 57 in the manner soon to be described, the valve 84 in descending supplies air to the left-hand end of cylinder 1, moves the piston 2 to the right and shifts the gears to a certain position depending upon the position of the cams 31 and 33. These cams are moved to their proper positions just before air is admitted to the cylinder 1 to shift the gears, as will later appear in the description of the general operation of the apparatus.

The compressed air or other motive fluid necessary for effecting movement of the several pistons may be supplied from a storage tank T (Fig. 5) carried by the motor vehicle and in which the motive fluid may be compressed by means of a suitable pump not shown. A pipe 92 serves to supply the motive fluid, such as compressed air, from the tank T to the air inlet 56.

The operation of the apparatus in its entirety is as follows. When the motor vehicle is at rest, it is desirable to have the gears in neutral position and the clutch engaged, this being the usual normal position of these parts when motor vehicles are not in operation. The hand lever 42 will then occupy the position shown in Fig. 6 and the notch $n^n$ will permit the auxiliary lever 44 to occupy its normal position in which the electric circuit for the solenoid is broken. After the engine of the motor vehicle is started and it is desired to shift the gears for reverse, the front end of the auxiliary lever 44 is depressed by the thumb of the operator, and this will serve to complete the electric circuit and energize the solenoid. Referring now to Fig. 5, from which the operation of the parts will be more obvious, the energization of the solenoid causes the core 66 to move downwardly and hence depress the valve 55 to admit air from the inlet 56 to the cylinder 57. The piston 58 in said cylinder will immediately move upwardly, and through the connections above described, will throw out the clutch. When the piston rod 60 nears the end of its upward stroke, the valve 84 will be lifted to admit air to the right-hand end of the cylinder 1 of the pneumatic gear shifting means G. This, however, will have no effect in moving the piston, as the piston already occupies its extreme left-hand position, as above stated, in which the gears are in neutral position. The hand lever 42 is now moved toward the notch $n^r$ and during the movement of the hand lever, the auxiliary lever 44 will be held in its depressed position, as the tooth 52 will engage under the solid portion of the quadrant 43. The thumb of the operator may now be removed from the auxiliary lever, if so desired, but it is obvious that even so, the auxiliary lever will not return to its normal position and the electric circuit controlling the solenoid will not, as yet, be broken. During the movement of the hand lever 42, the cams 31 and 33 will be shifted to the position shown in Fig. 7, and hence the selective lever 10 which produces movement of the gears for reverse, will be permitted to shift to its operative position. When the notch $n^r$ is reached, the auxiliary lever 44 is allowed to return to its normal position, as the tooth 52 will slip up through this notch. The electric circuit through the solenoid is then broken and the valve 55 is allowed to rise to the position shown in Fig. 5, in which position the air will be permitted to exhaust from the cylinder 57 and the clutch spring will reëngage the clutch. The piston valve 73 may be set by means of the hand lever 81 to control the speed of movement of the clutch to its engaged position, as above stated. Before the clutch is fully engaged, the valve 84 for supplying air to the cylinder 1 will have been lowered and air will be admitted to the left-hand end of the cylinder 1 to move the piston 2 to the right, and hence shift the rock lever 6 to the position shown in Fig. 7. As the selective lever 10 is in its operative position for engagement with the corresponding pin, the sleeve $b$ (Fig. 2) will be shifted to the left to place the gears in position for "reverse." Fig. 7, as well as Figs. 8, 9, 10 and 11 show the position of the parts in each instance after the gears have been shifted. By the time the clutch fully engages, the gears will have been shifted to their new position. The slow engagement of the clutch produced by the mechanism above described causes the motor vehicle to start moving gradually. It is obvious that by now depressing the forward end of the auxiliary lever 44 and returning the hand lever 42 to the position shown in Fig. 6, the above operations will be reversed and the gears will be shifted back to their neutral position.

In a similar manner, depression of the forward end of the auxiliary lever 44 and movement of the hand lever 42 to the notch $n^1$ will first throw out the clutch, shift the cams to the position shown in Fig. 8, and then produce shifting of the gears for first speed, due to the fact that in the position of the cams shown in Fig. 8, the selective lever 11 will be in its operative position.

If it now be desired to shift to second speed, the auxiliary lever 44 will be depressed to throw out the clutch and this will also result in a shifting of the gears back to neutral position, as whenever the clutch is thrown out, air is admitted to the right-hand end of the cylinder 1, and hence whichever selective lever is in its operative position will be retracted to its normal position and move the gears back to their neutral position. When the notch $n^2$ is reached and the clutch is allowed to reëngage, air will be admitted to the left-hand end of cylinder 1 to shift the gears for second speed, it being understood that movement of the hand lever 42 from the notch $n^1$ to the notch $n^2$ moves the cams to the position shown in Fig. 9 in which the selective lever 12 is in operative position. The operations in shifting from second speed to third speed are the same as those above described for shifting from first speed to second speed. Fig. 10 shows the positions of the cams for third speed in which the selective lever 13 is in operative position.

It will, therefore, be noted that if any of the gears are in mesh, the first actions that will take place upon depressing the forward end of the auxiliary lever 44 are the shifting of the clutch to its inoperative position and the immediate restoration of the gears to their neutral position. During the movement of the clutch to its operative position, the gears will be shifted for the next speed, but will be completely shifted to their new position before the clutch is fully engaged.

Whenever the hand lever 42 is in the main neutral position, that is, the position shown in Fig. 6, the cams are in the position shown in Fig. 11 in which all of the selective levers are in their inoperative positions.

If at any time it is desired to throw out the clutch while the motor vehicle is moving, it is only necessary to depress the forward end of the auxiliary lever 44. It is true that this will result in throwing the gears to neutral position, but if the hand lever 42 is not moved, when the clutch is reëngage the gears will move back to the same position which they occupied before the clutch was thrown out. If the hand lever 42 is moved after the clutch is thrown out, then before the clutch reëngages, the gears will automatically shift to a new position depending upon which notch the hand lever 42 is moved to.

It will be particularly noted that the hand lever 42 cannot be moved to effect shifting of the gears unless the auxiliary lever 44 is first depressed. Hence the gears cannot be shifted unless the clutch is thrown out. Furthermore, as the auxiliary lever 44 is held in its depressed position during movement of the hand lever 42, the clutch cannot move until after the gears are fully shifted.

It is obvious that the gears may be shifted from one speed to a remote speed without first shifting them through the intermediate speeds, for instance, if it is desired to shift from "first" to "third," the auxiliary lever 44 is held depressed during the entire movement of the hand lever 42 from the notch $n^1$ to the notch $n^3$. This movement of the hand lever 42 will shift the cams to the position shown in Fig. 10, and hence when the clutch reëngages, the gears will be shifted to their position for third speed.

Obviously the details of construction may be changed in many respects without departing from the spirit or scope of the invention as defined in the accompanying claims.

What is claimed is:—

1. The combination with the clutch and the gear shifting members of a motor vehicle, of pneumatic means to actuate the gear shifting members, pneumatic means to shift the clutch, and means whereby the operation of the clutch shifting means effects operation of the pneumatic means for actuating the gear shifting members.

2. The combination with the clutch and the gear shifting members of a motor vehicle, of pneumatic means to actuate the gear shifting members, power-operated means for shifting the clutch, and means whereby the operation of the clutch shifting means effects operation of the pneumatic means for actuating the gear shifting members.

3. The combination with the clutch and the gear shifting members of a motor vehicle, of power-operated means to shift the clutch and power-operated means to actuate the gear shifting members, and means whereby the operation of the clutch shifting means effects operation of the means for actuating the gear shifting members.

4. The combination with the clutch and the gear shifting members of a motor vehicle, of power-operated means to shift the clutch, manual means adapted to be actuated by the operator for controlling said power-operated clutch shifting means, power-operated means for actuating the gear shifting members, and means whereby operation of the clutch shifting means effects operation of the means for actuating the gear shifting members.

5. The combination with the clutch and the gear shifting members of a motor vehicle, of power-operated means to shift the clutch, electrically-operated means for controlling said power-operated means, means adapted to be actuated by the operator for controlling the electrical means, power-operated means for shifting the gear members, and means whereby the operation of the clutch shifting means effects operation of the gear shifting means.

6. The combination with the clutch and the gear shifting members of a motor vehicle, of pneumatic means to actuate the latter, selective connections between said pneumatic means and said gear shifting members to cause the former to produce proper movements of the latter, manually operable means to select the proper connections between the pneumatic means and the gear shifting members to produce the desired shifting of the gears, a valve to control the supply of compressed air to said pneumatic means, pneumatic means for shifting the clutch, and means whereby operation of said last-named pneumatic means effects operation of the pneumatic means for actuating the gear shifting members.

7. The combination of power-actuated gear shifting mechanism, power-actuated clutch shifting mechanism, electrical means to control the operation of the clutch shifting mechanism, and means whereby operation of the clutch shifting mechanism effects operation of the gear shifting mechanism.

8. The combination with the clutch and the gear shifting members of a motor vehicle, of pneumatic means for actuating the gear shifting members, a valve for admitting air to and exhausting it from the pneumatic means, pneumatic means for shifting the clutch, a valve for admitting air to and exhausting it from said last-named pneumatic means, electrical means to actuate said last-named valve, and means whereby operation of the pneumatic clutch shifting means actuates the valve for the pneumatic gear shifting means.

9. The combination with the clutch of a motor vehicle, of pneumatic means for shifting said clutch, and means to regulate the speed of operation of said pneumatic means, for the purpose described.

10. The combination with the clutch of a motor vehicle, of pneumatic means for shifting the clutch comprising a cylinder and a piston, means to admit compressed air to and exhaust it from said cylinder, means whereby the clutch is shifted to its inoperative position when air is admitted to said cylinder, and adjustable means to restrict the exhaust from said cylinder to control the speed of engagement of the clutch.

11. The combination with the clutch and the gear shifting members of a motor vehicle, of pneumatic means to actuate the latter, selective connections between said pneumatic means and said gear shifting members to cause the former to produce proper movements of the latter, manually operable means to select the proper connections between the pneumatic means and the gear shifting members to produce the desired shifting of the gears, pneumatic means for shifting the clutch, electrical means to control said last-named pneumatic means, means associated with said manually operable means to operate said electrical means, and means whereby operation of the pneumatic clutch shifting means effects operation of the pneumatic gear shifting means.

In testimony whereof, we affix our signatures.

MARY L. MacPHERSON,
CHARLES L. HARSHA,
*Executors of John G. MacPherson, deceased.*